US012748972B1

(12) United States Patent
Pyke et al.

(10) Patent No.: US 12,748,972 B1
(45) Date of Patent: Sep. 29, 2026

(54) NEURAL NETWORK MODEL CONVERSION PIPELINE

(71) Applicant: Zoox, Inc., Foster City, CA (US)

(72) Inventors: Jeffrey Ronald Pyke, Foster City, CA (US); Zejia Zheng, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 1331 days.

(21) Appl. No.: 17/199,973

(22) Filed: Mar. 12, 2021

Related U.S. Application Data

(60) Provisional application No. 62/988,872, filed on Mar. 12, 2020.

(51) Int. Cl.
*G06N 3/082* (2023.01)

(52) U.S. Cl.
CPC .................................... *G06N 3/082* (2013.01)

(58) Field of Classification Search
None
See application file for complete search history.

(56) References Cited

U.S. PATENT DOCUMENTS

| | | | | |
|---|---|---|---|---|
| 9,983,866 | B1 * | 5/2018 | Panchanathan | G06F 8/61 |
| 10,599,984 | B1 * | 3/2020 | Wubbels | G16H 50/20 |
| 2018/0365557 | A1 * | 12/2018 | Kobayashi | G06N 3/126 |
| 2020/0005135 | A1 * | 1/2020 | Che | G06N 3/0464 |
| 2020/0210812 | A1 * | 7/2020 | Baker | G06N 3/0895 |
| 2020/0302283 | A1 * | 9/2020 | Zhu | G06N 3/063 |
| 2020/0342968 | A1 * | 10/2020 | Avinash | G16H 50/30 |
| 2021/0174172 | A1 * | 6/2021 | Qadeer | G06F 17/18 |

OTHER PUBLICATIONS

Aguilar et al. "Knowledge Distillation from Internal Representations." arXiv:1910.03723v2 [cs.CL]. Jan. 16, 2020. 8 pages. (Year: 2020).*

Fan et al. "Learning to Teach." arXiv:1805.03643v1 [cs.LG]. 2018. 16 pages. (Year: 2018).*

* cited by examiner

*Primary Examiner* — Abdullah Al Kawsar
*Assistant Examiner* — Asher H. Jablon
(74) *Attorney, Agent, or Firm* — Lee & Hayes, P.C.

(57) ABSTRACT

Techniques are discussed herein for converting neural network models and validating the conversions to maintain accuracy and avoid performance regressions. A model conversion pipeline may execute inference on original and converted neural network models to identify potential accuracy regressions. A layer-by-layer conversion and analysis can be used to determine the errors generated by specific layers or operations within the model. In some examples, conversion and validation processes may be initiated on pre-trained neural networks. Latency data also may be collected for individual layers and compared between the original and converted neural network models. An automated pipeline incorporating various conversion and validation techniques may maintain sets of conversion options for different models, to perform automatic conversion, execution, validation, and deployment of updated neural network models to the cloud or other target systems.

22 Claims, 8 Drawing Sheets

NEURAL NETWORK MODEL CONVERSION PIPELINE

CROSS-REFERENCE TO RELATED APPLICATIONS

This application claims priority to and is a non-provisional of U.S. Patent Application No. 62/988,872, filed Mar. 12, 2020, and entitled "CONVERSION VALDIATION BETWEEN NEURAL NETWORK MODELS AND INFERENCE ENGINES," the disclosure of which is incorporated by reference herein in its entirety for all purposes.

BACKGROUND

Computer vision and image processing play important roles in technologies such as autonomous vehicles operation, security surveillance, medical image analysis, automated manufacturing processes, and many others. Computer vision systems may capture sensor data and apply image processing techniques such as segmentation, feature extraction, object recognition, and motion analysis. Using these techniques, such systems may perform computer vision tasks such as detecting and classifying objects, generating bounding boxes, and predicting object trajectories.

Computer vision systems may use deep learning techniques such as trained neural networks to process information and perform analyses/predictions. Such processing is often performed in resource-constrained environments, where the amount of available processing, memory, and/or processing time may be limited. These resource-constrained environments can present challenges in accurate and timely processing of data using trained neural networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
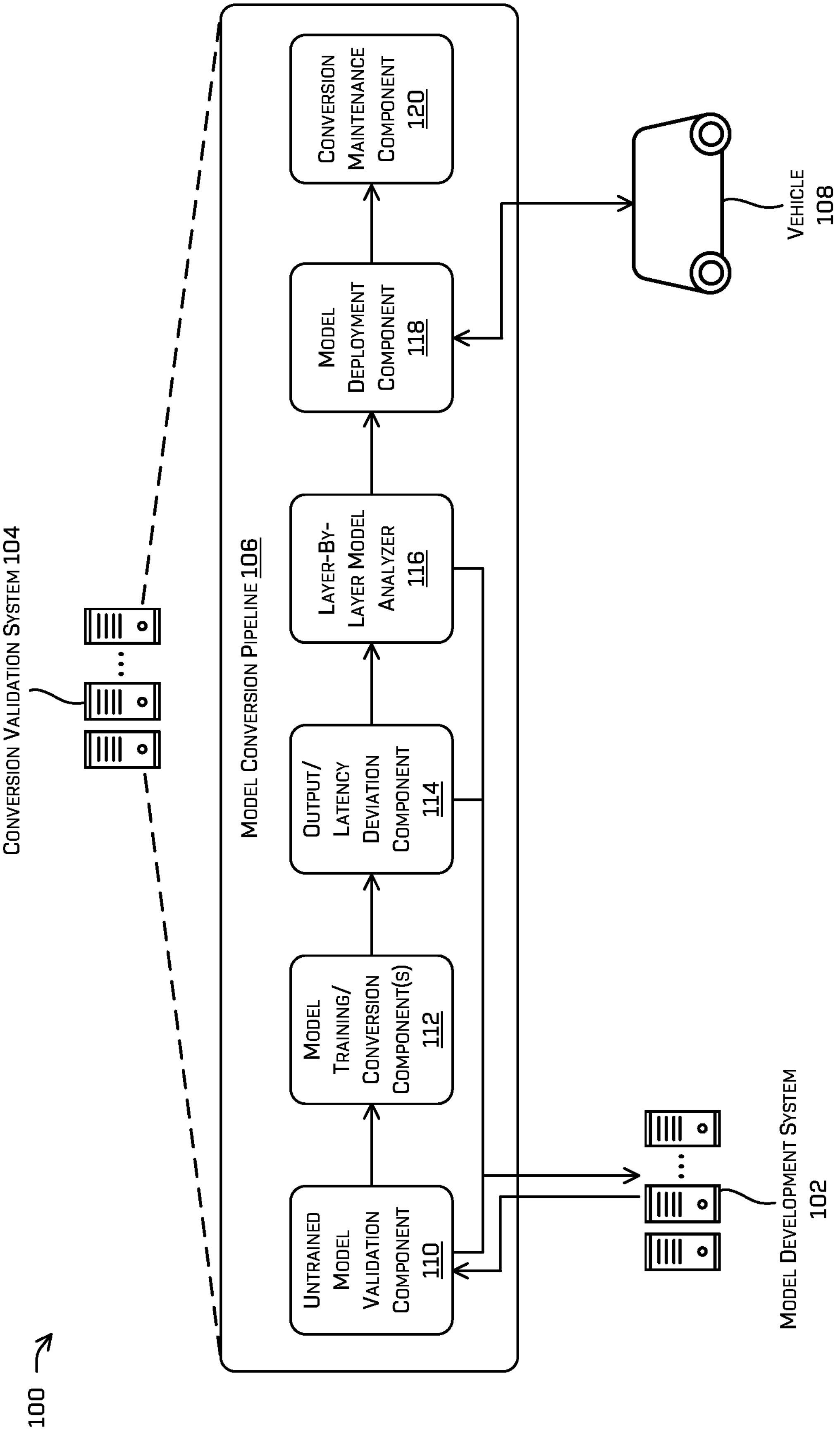
FIG. 1 illustrates an example computing environment including a model development system, conversion validation system, and a vehicle on which a trained neural network model may be deployed, in accordance with one or more implementations of the disclosure.

The techniques discussed herein relate to converting neural network models and validating the conversions to maintain model accuracy and avoid performance regressions. In various examples, a model conversion pipeline may include a number of components operating individually and/or in combination to validate that a converted neural network model provides timely and accurate outputs as compared to the original model on which the converted model was based. For instance, the model conversion pipeline may execute inference operations on the original and converted model to identify regressions with respect to output accuracy and/or model latency. In some examples, the model conversion pipeline may perform layer-by-layer conversions and/or analyses to identify the particular layers or operations of a converted model that are responsible for regressions. Conversion and validation processes may be initiated both on trained and/or untrained neural networks in some cases, in order to detect potential regressions associated with the converted model before training the neural network. As described in more detail below, the model conversion pipeline may be implemented via a number of interconnected components configured to receive, convert, and validated neural network models, before deploying the converted models to the cloud and/or other target systems.

Neural networks include arrangements of interconnected nodes configured to transform one or more inputs received via input nodes, into one or more outputs provided via output nodes. Examples of neural networks include but are not limited to convolutional neural networks (CNNs), fully connected neural networks recurrent neural networks (RNNs), graph neural networks (GNNs), and various other machine learning models. As used herein, the term "neural network model" may refer to data representing the structure of a neural network, such the architecture, arrangement of nodes, layers, weights and/or operations within the neural network. Neural network models (which may be referred to simply as "models"), as used herein may refer both to neural networks that have been generated based on models, as well models that have been designed/developed but have not been generated (or instantiated) as neural networks.

As noted above, neural network models may use deep machine learning techniques to process information and provide inference outputs. Neural network models can be deployed in various different technological and industrial contexts. Within computer vision systems, for example, the inference outputs of a neural network may correspond to a detection, segmentation, or classification of objects within an environment, based on sensor data input to the neural network. Before a neural network can be deployed to a target system, the neural network model may be designed, developed, and trained. A number of different neural network frameworks and software tools exist for performing neural network design, implementation, and training. Additionally, a number of different inference engines (or execution engines) also exist for executing trained neural networks in deployment environments, by providing data to the input nodes of the neural network, executing the operations of each node and/or layer, and capturing the outputs provided via the output nodes.

Techniques described herein relate to validating converted neural network models based on original models that may have similar or identical structures and may be configured to perform similar or identical inference tasks. In some cases, models may be converted for use in different neural network frameworks and/or for execution by different inference engines. For instance, a model developed within one system may be converted to provide architectural compatibility, improved accuracy, and/or improved performance when the neural network is executed in a separate target system. As an example, a model developed using a deep learning software tool may be converted into a converted model that is compatible with a separate high-performance deep learning inference engine configured to provide low latency and high throughput for inference applications. The target system on which a converted model is to be executed may have different types, speeds, and numbers of processing units (e.g., CPUs versus GPUs), different available memory resources, different network resources, and the like, as compared to the system on which the model was developed and/or trained. Additionally, different target systems may have different performance requirements with respect to speed, precision, asynchronous and concurrent inference capabilities, etc.

However, conventional model conversion processes may fail, and also may have the potential to introduce output accuracy regressions and/or latency regressions into the converted model. Converting a trained model may involve converting an original model into an intermediate representation using a standard model format (e.g., the Open Neural Network Exchange (ONNX) format), and then converting the intermediate representation into a converted model that is compatible with the desired inference engine. However, in such examples, the original model format, the intermediate representation format, and the converted model format each may support different sets of operations. As a result, certain operations and/or layers in the original model may be unsupported by the target system, causing the converted model to fail. In such cases, conversions of models from original to converted models may include replacing certain operations in certain layers of the original model with replacement operations in the corresponding layers of the converted model. Additionally, different combinations of kernal size and stride, as well as conversions to different precision levels (e.g., FP32, FP16, INT8), may cause different behaviors in different inference engines, resulting in accuracy and/or performance regressions in the converted model. The techniques described herein provide various improvements over conventional model conversion processes, including pre-training conversion validation and layer-by-layer inspection, to provide more accurate and performant converted neural network models and increased efficiency in model training and analyses.

FIG. 1 shows a computing environment 100 including a model development system 102, a conversion validation system 104 configured to execute a model conversion pipeline 106, and a vehicle 108 configured to receive and execute converted neural network model(s). In this example, the model conversion pipeline 106 includes number of components arranged in a processing pipeline to convert, validate, and deploy a model from the model development system 102 to the vehicle 108. The components in the model conversion pipeline 106 include an untrained model validation component 110, a model training/conversion component(s) 112, an output/latency deviation component 114, a layer-by-layer model analyzer 116, a model deployment component 118, and a conversion maintenance component 120, each of which is described below in more detail. Each of the components 110-120 may be invoked and may perform individually, or may operate in conjunction in response to a neural network model provided by a source system (e.g., model development system 102) to train, convert, validate, and deploy the converted neural network model to a target system (e.g., vehicle 108).

In various implementations, each of the components 110-120 within the model conversion pipeline 106 may be divided, combined, and/or arranged differently from the component arrangement shown in this example. Any or all of the components within the conversion validation system 104 may be integrated into the model development system 102. As an example, the model development system 102 may include a neural network development framework configured to design, develop, and train neural networks model. In some cases, the model development system 102 (and/or a separate conversion system) may be configured to convert original neural networks models into converted models, in response to conversion requests including conversion options based on the target system(s). In such cases, the conversion validation system 104 may include a validation pipeline with components configured to validate converted models (e.g., an untrained model validation component 110, an output/latency deviation component 114, a layer-by-layer model analyzer 116, and a conversion maintenance component 120), but need not perform any model development, training, conversion, or deployment tasks.

Some or all of the components of the model conversion pipeline 106 may output model validation results based on performing a model conversion and/or validation task. For example, the untrained model validation component 110, the output/latency deviation component 114, and the layer-by-layer model analyzer 116 each may output validation results for a model. The model validation results may be output to other components within the model conversion pipeline 106, for example, to cause another component to initiate a different conversion/validation process on the model. Additionally or alternatively, the results of model validation processes may be output to the model development system 102 and/or the target system (e.g., vehicle 108). For instance, when the validation results generated by a component of the model conversion pipeline 106 indicate that the converted model does not perform in a sufficiently similar manner to the original model, the validation process may be classified as failing. The determination that a converted model has failed a validation process may be based on performance similarity thresholds between the converted model and the original model, including thresholds for model output accuracy and speed (e.g., latency). In some cases, data indicating validation failures and/or details of the failures may be transmitted to the model development system 102 so that the model may be redesigned, updated, and resubmitted to the model conversion pipeline 106. Additionally, any conversion validation data that indicates inconsistencies in the model accuracy or performance between original and converted models, or between different versions of converted models (e.g., different inference engine versions) also may be provided to source and/or target systems to allow them to reconfigure their applications based on the inconsistencies.

The untrained model validation component 110 is configured to validate the accuracy and/or performance of converted neural network models before they are trained.

Training processes for large-scale neural networks may be computationally expensive and time-consuming, and thus identifying potential regressions in converted models before training the models may provide advantages in the efficiency and computing resources required to train, convert, and deploy models to target systems. In various implementations, the untrained model validation component 110 may be implemented within the model conversion pipeline 106, within the model development system 102, or within a separate computer system.

The untrained model validation component 110 may receive a model definition from a source system (e.g., model development system 102), and may construct a neural network based on the model using weights assigned based on random selection (or based on other predetermined weight values). Because the model has not yet been trained, the random weights (or other predetermined weights) may be used to determine a frozen model associated with the source system. The untrained model validation component 110 may then initiate a conversion process, which may be performed by the model development system 102, the conversion validation system 104, or other computing system, to the convert the original model (e.g., the frozen model with randomly selected weights) to a converted model.

The conversion process performed by the untrained model validation component 110 may result in a successful conversion of the model or may produce one or more failures. For example, the untrained model validation component 110 may detect that the converted model includes one or more operations that are unsupported by the target system (e.g., vehicle 108) to which the converted model is to be deployed. To determine if the converted model includes unsupported operations, in some cases the untrained model validation component 110 may access listings of specific working and failing operations associated with the inference engine(s) of the target system(s). Listings of the working and failing operations for different inference engines may be stored, for example, in the untrained model validation component 110 and/or in the conversion maintenance component 120. When determining that the converted model includes operation(s) (e.g., a single operation or a minimum difference threshold) unsupported by an inference engine of the target system, the untrained model validation component 110 may classify the model conversion as a failure.

In some cases, the untrained model validation component 110 may use similar or identical techniques to detect hyperparameters in the converted model that are incompatible or cause performance issues with the inference engine(s) of the target system(s). Certain types of hyperparameters or values of hyperparameters such as convolution size, number of hidden layers, dropout percentage, and activation function may cause unsupported to be executed, or may cause other failures and/or known execution issues for certain inference engines. Accordingly, the untrained model validation component 110 may analyze the converted model and determine a conversion failure when the hyperparameters of the converted model include individual hyperparameters or sets of hyperparameters that are associated with known failures or execution issues for the inference engine.

In some examples, untrained model validation component 110 may provide additional efficiency by analyzing specific portions of the model. For instance, the untrained model validation component 110 may analyze the inputs and outputs of the model, but might not analyze the loss functions, backpropagation, and/or other portions of the neural network model graph which will not impact the execution by the inference engine of the target system.

When the untrained model validation component 110 determines a failure in the converted model, it may transmit data indicating the failure to the model development system 102. The model development system 102 may re-design and re-develop the model to use operations and/or hyperparameter that are supported and do not result in execution issues for the inference engine of the target system. After a conversion failure for a first model, the model development system 102 may resubmit an updated models to the untrained model validation component 110 to validate the updated model. The process may be performed repeatedly until the untrained model validation component 110 runs without failure for a model, after which the training of the untrained model may be initiated.

The model training/conversion component(s) 112 may be configured to initiate training of the neural network model, and then conversion of the model into a converted model configured for deployment to one or more target systems. As noted above, in some examples the training of the model, and the conversion of the fully-trained model may be performed in response to the untrained model validation component 110 running without failure on the untrained model. In some examples, the training and/or conversion of the model may be performed on the conversion validation system 104. In other examples, the model training and/or conversion may be performed within the model development system 102, or on separate computing system(s). For instance, the model training/conversion component(s) 112 may receive data indicating the computing architecture of the target system(s) (e.g., a specified GPU microarchitecture) and/or other conversion options (e.g., memory format, input shape/dimensions, output shape/dimensions, upload path, encryption, etc.) associated with the target systems, and may transmit instructions to the model development system 102 to initiate the training and appropriate conversion(s) based on the conversion options.

The output/latency deviation component 114 is configured to validate the converted model by comparing the accuracy of the outputs and/or latencies of the converted model to the corresponding output accuracy and/or latencies of the original (unconverted) model. When invoked for a converted model, the output/latency deviation component 114 may execute both the converted model and the original model on which the converted model is based. The output/latency deviation component 114 may provide the same sets of inputs, which may be random inputs or other predetermined input data, to both the original and converted model, and then compare the outputs from the two models in order to validate that the converted model operates as intended.

In various examples, the output/latency deviation component 114 may execute the original and converted models using the same platform and/or inference engine, or on different platforms and/or inference engines. As noted above, the original and converted models may include different sets of operations based on the particular source/target systems associated with the models. Accordingly, in some examples the output/latency deviation component 114 may execute the original model using a first inference engine associated with the model development system 102, to ensure that the original model performs as intended by the model developer, and may execute the converted model using a second inference engine associated with the target system(s) (e.g., vehicle 108) to provide similar outputs to those expected in a deployed environment.

The model outputs captured and compared by the output/latency deviation component 114 may include the outputs produced by the output nodes of the models in response to the input data, and/or performance data including execution times or latencies observed while processing the data. By comparing the outputs from the original and converted models, the output/latency deviation component 114 may determine output accuracy and/or latency metrics associated with the converted model, corresponding to the amounts of output deviation between the converted model and the original model.

The output/latency deviation component 114 may use any amount of input data and may perform any number of comparisons between the original and converted models. An output accuracy deviation value and/or latency deviation value may be determined for each comparison, and when multiple comparisons are performed the output/latency deviation component 114 may calculate deviation distributions for model accuracy and/or latency. In some examples, the deviation values and/or distributions may be compared to difference thresholds to determine whether or not the converted model performs sufficiently similar to the original model. Some amount of deviation between the original and converted models may be acceptable and expected in some cases. For instance, the inference engine for a target system may be configured to operate with a different level of precision and/or different speed, and may configured to operate on different computing architectures. Accordingly, deviation thresholds and/or deviation distribution thresholds may be selected that take into account the acceptable level of output accuracy and/or latency differences between the original and converted models.

The layer-by-layer model analyzer 116 also may compare the outputs of the original model with the outputs of the converted model, but may perform the comparisons for individual neural network layers (and/or operations) rather than for the neural network models as a whole. By comparing model accuracy and/or latency for individual layers of the converted model, the layer-by-layer model analyzer 116 may determine the particular layer(s) that are responsible for the deviations between the original and converted models. In some cases, the output/latency deviation component 114 may be executed first, and the layer-by-layer model analyzer 116 may be executed when the deviation amount (e.g., deviation distribution) for the converted model as a whole is greater than a deviation threshold. In such cases, when the deviation amount for the converted model is below the deviation threshold, the layer-by-layer model analyzer 116 need not be executed.

During execution, the layer-by-layer model analyzer 116 may convert a portion of the original neural network model, generating a partially converted model (or converted subnetwork). For instance, the layer-by-layer model analyzer 116 may initiate a conversion process for each intermediate layer (or operation) in the original model. The layer-by-layer model analyzer 116 then may perform output comparisons between the converted portion (e.g., converted layer(s)) and the corresponding unconverted portions of the original model. The output comparisons may be similar or identical to those performed by the output/latency deviation component 114, and in some cases the layer-by-layer model analyzer 116 may invoke the output/latency deviation component 114 for each different layer inspection. Using the output comparisons, the layer-by-layer model analyzer 116 may determine the maximum and/or median output deviations for each layer of the converted model, with respect to the corresponding layer in the original model.

In some implementations, layer-by-layer model analyzer 116 may proceed sequentially through the neural network model, by converting and analyzing each layer starting with the most upstream layer at the beginning of the model (e.g., nearest the input nodes) to the most downstream layer at the end of the model (e.g., nearest the output nodes). In some cases, the layer-by-layer model analyzer 116 might not convert and analyze every layer, but may sequentially convert and analyze certain types of layers (e.g., convolution layers, upsampling layers, etc.). When a significant deviation is found at a certain layer, the layer-by-layer model analyzer 116 may cease moving through the model sequentially, and may switch to a granular approach to identify the specific layer, sublayer, and/or operations that are responsible for the deviation. When using a granular approach, the layer-by-layer model analyzer 116 may select an upstream layer as the next layer to convert and analyze when the current layer has a relatively large deviation from the original model, and may select a downstream layer as the next layer when the current layer has a relatively small deviation from the original model. In contrast to a sequential progression through the model, in some cases the layer-by-layer model analyzer 116 may perform a first conversion at a center layer with the model, and then may select either an upstream or downstream layer depending on the output deviation at the center layer. The process may be repeated to identify the layer(s) responsible for the deviation between the original and converted models, and may use fewer overall conversions to identify the deviating layers.

As shown in FIG. 1, when one or more of the components of the model conversion pipeline 106 determines a failure when converting or validating a model, it may provide data indicating the failure to the model development system 102. For example, the untrained model validation component 110 may transmit failure data indicating that an error occurred when generating the converted model based on the original model. The output/latency deviation component 114 may transmit the deviation data for the converted model, which may be greater than a deviation threshold, indicating that the converted model does not perform in a sufficiently similar manner to the original model. Additionally or alternatively, the layer-by-layer model analyzer 116 may transmit failure data identifying the layer(s) and/or operation(s) of the converted model that are responsible for the output deviation in the converted model.

After receiving model conversion/validation failure data from the model conversion pipeline 106, the model development system 102 may update (e.g., redesign or redevelop) the model, and resubmit the updated model back to the model conversion pipeline 106. The updating of the model may include updates to the original model and/or updates to conversion techniques used to construct the converted model from the original model.

When the components of the model conversion pipeline 106 determine that the original model can be converted without errors, and that the converted model performs in a sufficiently similar manner to the original model (e.g., output deviation below a threshold), then the model conversion pipeline 106 may initiate a model deployment component 118 and/or conversion maintenance component 120. The model deployment component 118 may be configured to deploy a converted and validated model to a target system or environment. In this example, the target system may include a vehicle 108, and the model may correspond to a model to process sensor data and perform segmentation, feature extraction, object detection and recognition, bounding box determination, motion analysis and prediction, and the like. In some examples, the model deployment component 118 may be configured to upload the validated converted model to a cloud-based deployment environment, from where it may be downloaded and installed on various target systems. Additionally, although this example relates to neural networks models for use in autonomous vehicles, the techniques described herein for converting and validating models may be applied to neural network models in other technical fields including but not limited to security, healthcare data analysis, agriculture, industrial design, and financial data analysis.

The conversion maintenance component 120 may include one or more data stores configured to store data associated with valid and invalid model conversions. In some examples, the conversion maintenance component 120 may store conversion options (e.g., memory format, input shape/dimensions, output shape/dimensions, upload path, encryption, etc.) associated with different target systems. For instance, the conversion maintenance component 120 may store and update sets of conversion options associated with each different combination of a computing architecture type, inference engine type, and/or target system requirements. Additionally or alternatively, the conversion maintenance component 120 may store and update listings of operations and/or hyperparameters that are supported and not supported by different inference engines or target systems. For the listings of unsupported operations and/or hyperparameters associated with an inference engine, the conversion maintenance component 120 also may store equivalent sets of supported operations and/or hyperparameters that may be used as alternatives in a converted model.

Figure 2:
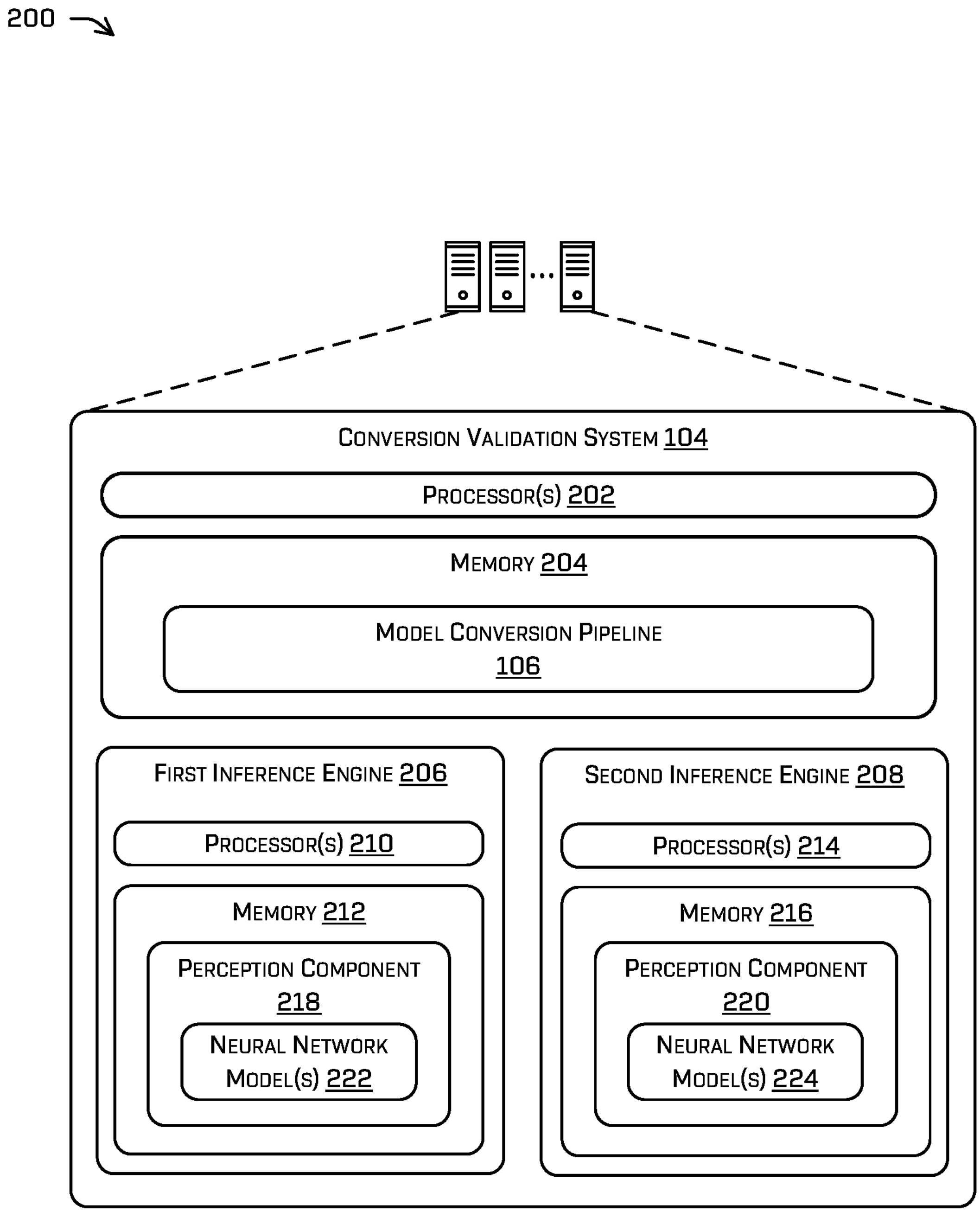
FIG. 2 illustrates components of an example system for converting and validating a neural network model, in accordance with one or more implementations of the disclosure.

FIG. 2 illustrates an example computing environment 200 in which the techniques discussed herein may be implemented. In particular, the computing environment 200 includes an example implementation of a conversion validation system 104, introduced above. In this example, the conversion validation system 104 includes processor(s) 202 and memory 204, in which a model conversion pipeline 106 may be executed. Additionally, the conversion validation system 104 includes a first inference engine 206 and a second inference engine 208. The first inference engine 206 includes processor(s) 210 and memory 212. Similarly, the second inference engine 208 includes processor(s) 214 and memory 216. The processors (e.g., processor(s) 210 associated with the first inference engine 206, and processor(s) 214 associated with the second inference engine 208) may each comprise one or more GPUs, one or more CPUs, one or more tensor processing units, one or more neural processing units, one or more digital signal processors, etc. The first inference engine 206 and the second inference engine 208 may have different computer architectures and capabilities, such as different processors (e.g., different processing cores, types, speeds, etc.), different memory (e.g., memory types, speeds, formats, etc.), well as different firmware, system buses, configurations, perception versions, and the like. In some cases, the first inference engine 206 may be implemented as a CPU and the second inference engine 208 may be implemented as a GPU, or vice versa, although other configurations may be used.

As discussed above, the first inference engine 206 and second inference engine 208 may operate independently and each may be configured to execute one or more neural networks based on neural network models. In this example, first inference engine 206 and second inference engine 208 may respectively execute perception components 218 and 220, which respectively include neural network models 222 and 224. In this example, the perception components 218 and 220 may correspond to perception components associated with an autonomous vehicle, and the neural network models 222 and 224 may be configured to perform computer vision processing operations for the autonomous vehicle. For instance, neural network models 222 and 224 may be configured to detect one or more objects based on sensor data received via the sensors of an autonomous vehicle. Additional discussion of perception operations of the perception component 218 and 220 and the neural network models 222 and 224 therein is provided in U.S. patent application Ser. Nos. 16/201,842, 16/234,862, 16/238,475 and 16/386,249, the entirety of which are incorporated herein by reference.

The model conversion pipeline 106 may perform operations discussed herein to initiate, manage, and validate the conversion of an original neural network model to a converted model for execution within one or more target systems. As discussed above, the model conversion pipeline 106 may use various techniques to validate the conversion of a model, including comparing the outputs and the performance (e.g., latency) of the original model and the converted model. Such comparisons may be performed before training the original model (e.g., by the untrained model validation component 110), after the original model is fully trained (e.g., by the output/latency deviation component 114), and/or by comparing corresponding intermediate layers or operations in the models (e.g., by the layer-by-layer model analyzer 116). To perform the comparisons, the model conversion pipeline 106 may use the first inference engine 206 to execute the original model (e.g., neural network model(s) 222) and may use the second inference engine 208 to execute the converted model (e.g., neural network model(s) 224), or vice versa. As noted above, different inference engines may support different sets of operations, may perform process different hyperparameters in different ways, and may behave differently when executing various different types of neural networks. Accordingly, in some examples the first inference engine 206 may correspond to an inference engine used by the model development system 102, to ensure that the original model performs as intended by the model developer, and the second inference engine 208 may correspond to an inference engine used by the target system to ensure that it provides comparable output and performance.

In this example, the model conversion pipeline 106, first inference engine 206, and second inference engine 208 are depicted as operating within same computer system. In various examples, the conversion validation system 104 may including separate computing environments, separate partitions, and/or virtual machines to implement a model conversion pipeline 106 and one or more inference engine instances. In other examples, the model conversion pipeline 106, first inference engine 206, and second inference engine 208 need not be implemented within same computer syste. For instance, the conversion validation system 104 may execute a model conversion pipeline 106 that is configured to control the instantiation of inference engines that execute on separate computer systems.

Figure 3:
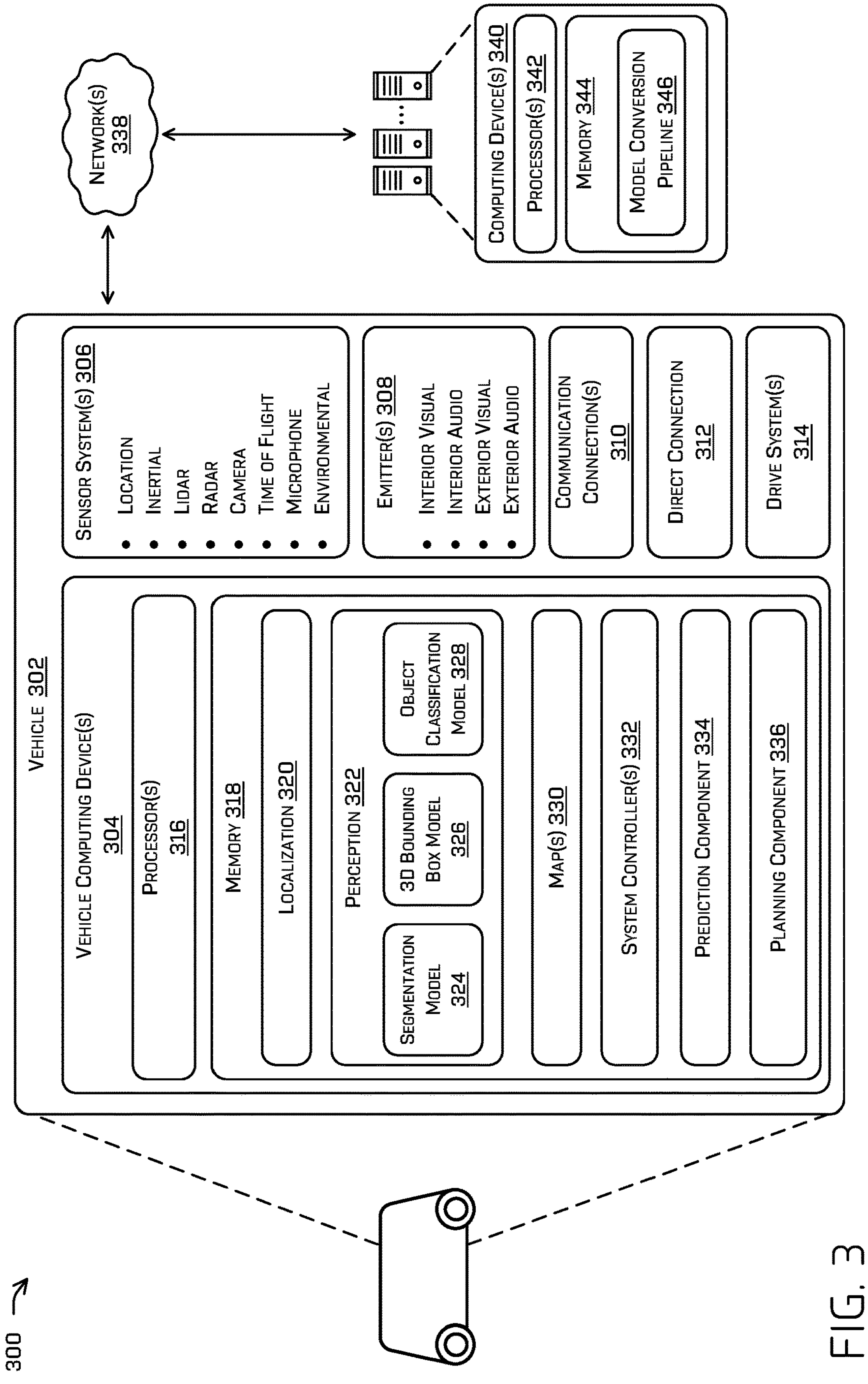
FIG. 3 depicts a block diagram of an example system for implementing various techniques described herein.

FIG. 3 depicts a block diagram of an example system 300 for implementing various techniques described herein. In at least one example, the system 300 can include a vehicle 302, which can correspond to an autonomous or semi-autonomous vehicle configured to perform object perception and prediction functionality, route planning and/or optimization. The example vehicle 302 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 302 can be configured to control all functions from start to completion of the trip, including all parking functions, it may not include a driver and/or controls for driving the vehicle 302, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 302 can include vehicle computing device(s) 304, one or more sensor systems 306, one or more emitters 308, one or more communication connections 310, at least one direct connection 312, and one or more drive systems 314.

The vehicle computing device(s) 304 can include one or more processors 316 and memory 318 communicatively coupled with the one or more processors 316. In the illustrated example, the vehicle 302 is an autonomous vehicle; however, the vehicle 302 could be any other type of vehicle or robotic platform. In the illustrated example, the memory 318 of the vehicle computing device(s) 304 stores a localization component 320, a perception component 322 comprising a number of trained neural network models 324-328, one or more maps 330, one or more system controllers 332, a prediction component 334, and a planning component 336. Though depicted in FIG. 3 as residing in the memory 318 for illustrative purposes, one or more of the localization component 320, the perception component 322, the maps 330, the system controllers 332, the prediction component 334, and the planning component 336 can additionally, or alternatively, be accessible to the vehicle 302 (e.g., stored on, or otherwise accessible by, memory remote from the vehicle 302).

In at least one example, the localization component 320 can include functionality to receive data from the sensor system(s) 306 to determine a position and/or orientation of the vehicle 302 (e.g., one or more of an x-, y-, z-position, roll, pitch, or yaw). For example, the localization component 320 can include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 320 can provide data to various components of the vehicle 302 to determine an initial position of an autonomous vehicle for generating a trajectory and/or for determining that an object is proximate to one or more crosswalk regions and/or for identifying candidate reference lines, as discussed herein.

In some instances, and in general, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, building, tree, road surface, curb, sidewalk, stoplight, stop sign, unknown, etc.). In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As shown in this example, the perception component 322 may execute a number of trained models, including but not limited to a segmentation model 324, a 3D bounding box model 326, and an object classification model 328. Models 324-328 may represent examples of the neural network models 222 and 224 that may be converted and validated in various implementations of the model conversion pipeline 106. In this example, the segmentation model 324 may be configured to output segmented sensor data to downstream components within the perception component 322. The 3D bounding box model 326 may be configured to receive inputs from upstream components within the perception component 322, and determine bounding box(es) for one or more objects that are reflected in the processed sensor data and that correspond to the segmented sensor data received from the segmentation model 324. The object classification model 328 may output a semantic label for a portion of sensor data that has been segmented, based at least in part on the segmented sensor data received from the segmentation model 324 and/or 3D bounding box model 326. For example, the semantic label may include any semantic label that the object classification model 328 is configured to output upon evaluation (e.g., "pedestrian," "two-wheeled vehicle," "bicyclist," "parked vehicle").

In some examples, models 324-328 within the perception component 322 and/or models used by other components of the vehicle 302 can be trained by based on driving data logs to determine the behaviors, movements, and/or interactions between objects in the environment, including behaviors and interactions between entities and map elements, and between entities and other entities. Such behaviors and interactions can be identified, and data representing behaviors and interactions can be identified as training data. The training data can be input to train the various neural network models (and/or other machine learning models) described herein, where a known result (e.g., a ground truth, such as the known "future" attributes) can be used to adjust weights and/or parameters of the models to improve the accuracy of inferred updated states and to minimize errors.

The memory 318 can further include one or more maps 330 that can be used by the vehicle 302 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 330 can include at least one map (e.g., images and/or a mesh). In some examples, the vehicle 302 can be controlled based at least in part on the maps 330. That is, the maps 330 can be used in connection with the localization component 320, the perception component 322, the prediction component 334, and/or the planning component 336 to determine a location of the vehicle 302, identify objects in an environment, and/or generate routes and/or trajectories to navigate within an environment.

In at least one example, the vehicle computing device(s) 304 can include one or more system controllers 332, which can be configured to control steering, propulsion, braking, safety, emitters, communication, and other systems of the vehicle 302. These system controller(s) 332 can communicate with and/or control corresponding systems of the drive system(s) 314 and/or other components of the vehicle 302.

In general, the prediction component 334 can include functionality to generate predicted information associated with objects in an environment. As an example, the prediction component 334 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 302 traverses an environment. In some examples, the prediction component 334 can generate one or more predicted positions, predicted velocities, predicted trajectories, etc., for such target objects based on attributes of the target object and/or other objects proximate the target object. Although in this example, the models 324-328 are depicted within the perception component 322, it can be understood that the functionality of the prediction component 334 may include various trained models which also may be converted and validated using the techniques described herein.

In general, the planning component 336 can determine a path for the vehicle 302 to follow to traverse the environment. For example, the planning component 236 can determine various routes and trajectories and various levels of detail. For example, the planning component 336 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 336 can generate an instruction for guiding the autonomous vehicle along at least a portion of the route from the first location to the second location. In at least one example, the planning component 336 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In some instances, the planning component 336 can generate one or more trajectories for the vehicle 302 based at least in part on predicted location(s) associated with object(s) in an environment. In some examples, the planning component 336 can use temporal logic, such as linear temporal logic and/or signal temporal logic, to evaluate one or more trajectories of the vehicle 302.

As can be understood, the components discussed herein (e.g., the localization component 320, the perception component 322, the models 324-328, one or more maps 330, the one or more system controllers 332, the prediction component 334, and the planning component 336) are described as divided for illustrative purposes. However, the operations performed by the various components can be combined or performed in any other component. Further, any of the components discussed as being implemented in software can be implemented in hardware, and vice versa. Further, any functionality implemented in the vehicle 302 can be implemented in the computing device(s) 340, or another component (and vice versa).

In at least one example, the sensor system(s) 306 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the time of flight sensors can include individual time of flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304. Additionally or alternatively, the sensor system(s) 306 can send sensor data, via the one or more networks 338, to the one or more computing device(s) 340 at a particular frequency, after a lapse of a predetermined period of time, in near real-time, etc.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device(s) 304 to another computing device or a network, such as network(s) 238. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive systems 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include one or more sensor systems to detect conditions of the drive system(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 314. Furthermore, the drive system(s) 314 also include one or more communication connection(s) that enable communication by the respective drive system with one or more other local or remote computing device(s).

In at least one example, the direct connection 312 can provide a physical interface to couple the one or more drive system(s) 314 with the body of the vehicle 302. For example, the direct connection 312 can allow the transfer of energy, fluids, air, data, etc. between the drive system(s) 314 and the vehicle. In some instances, the direct connection 312 can further releasably secure the drive system(s) 314 to the body of the vehicle 302.

In at least one example, the localization component 320, the perception component 322, the one or more maps 330, the one or more system controllers 332, the prediction component 334, and the planning component 336 can process sensor data, as described above, and can send their respective outputs, over the one or more network(s) 338, to one or more computing device(s) 340. In at least one example, the respective outputs of the components can be transmitted the one or more computing device(s) 340 at a particular frequency, after a lapse of a predetermined period of time, in near real-time, etc. Additionally or alternatively, the vehicle 302 can send sensor data to one or more computing device(s) 340 via the network(s) 338, including raw sensor data, processed sensor data and/or representations of sensor data. Such sensor data can be sent as one or more log files to the computing device(s) 340 at a particular frequency, after a lapse of a predetermined period of time, in near real-time, etc.

The computing device(s) 340 can include processor(s) 342 and a memory 344 storing a model conversion pipeline 346. In some instances, the model conversion pipeline 346 can include functionality similar to identical to the model conversion pipeline 106 described above, including converting models and/or validating converted models for deployment to target systems (e.g., vehicle 302).

As noted above, neural network models 324-328 such as CNNs to perform computer vision functionality within a perception component 322, and/or other neural networks, are algorithms which pass input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of CNNs and neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures that may be used to implement the techniques described herein include neural networks such as ResNet50, ResNet101, VGG, DenseNet, PointNet, and the like.

The processor(s) 316 of the vehicle 302 and the processor(s) 342 of the computing device(s) 340 can be any suitable processor capable of executing instructions to process data and perform operations as described herein. By way of example and not limitation, the processor(s) 316 and 342 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 344 are examples of non-transitory computer-readable media. The memory 318 and 344 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the computing device(s) 340 and/or components of the computing device(s) 340 can be associated with the vehicle 302. That is, the vehicle 302 can perform one or more of the functions associated with the computing device(s) 340, and vice versa.

Figure 4:
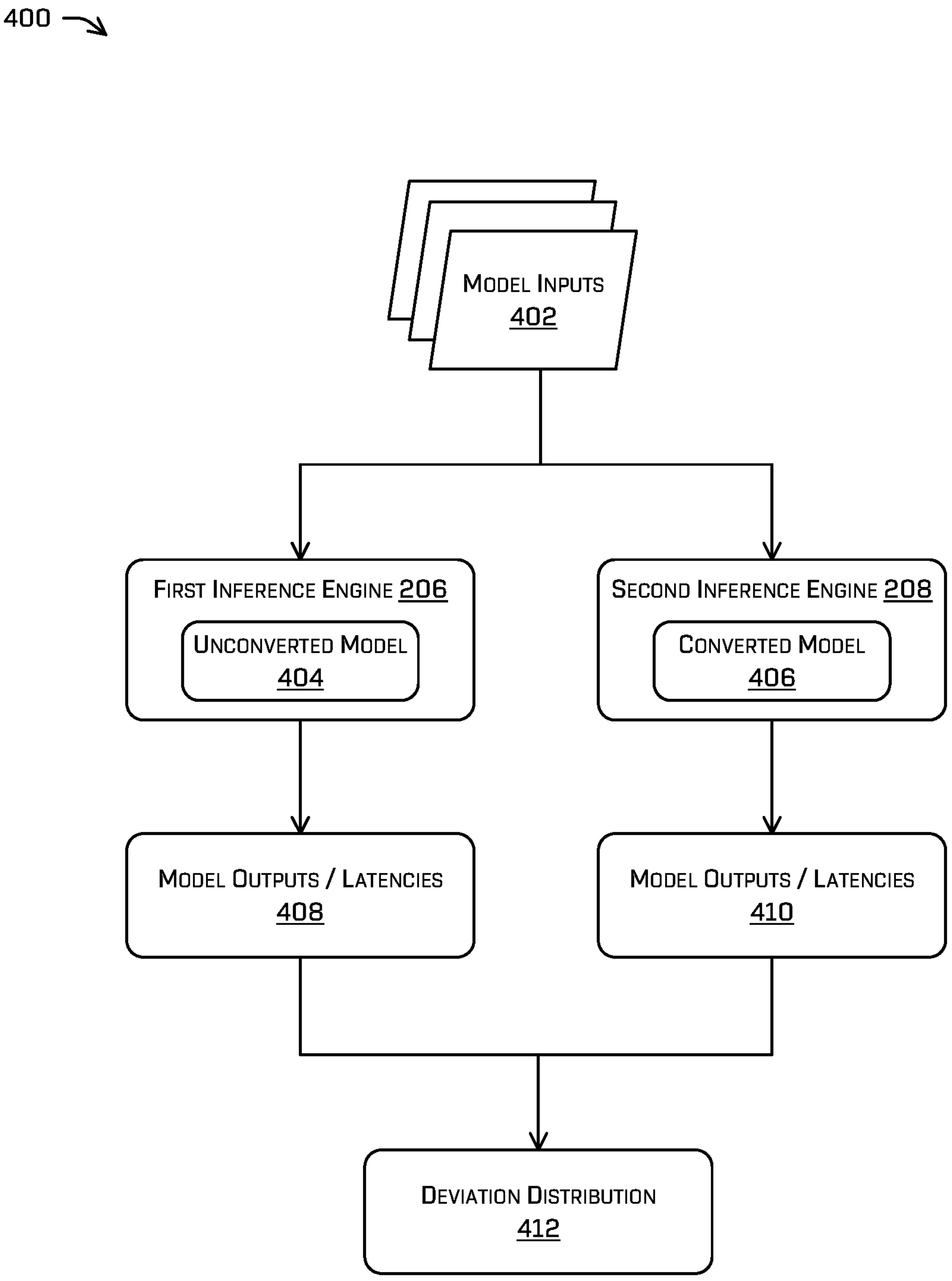
FIG. 4 illustrates components of an example system for determining a deviation distribution between different neural network models executed using different inference engines, in accordance with one or more implementations of the disclosure.

FIG. 4 illustrates an example techniques 400 for determining a deviation distribution between an original model and a converted model. In some examples, techniques 400 may be used to implement the functionality of the output/latency deviation component 114. As discussed above, converted models may be validated by comparing the model outputs and/or performance between the converted models and corresponding original (or unconverted models), one or multiple times during a model validation process. Techniques 400 may be used, for example, to validate the outputs of a converted model, and/or the performance of a converted model, before or after training.

Model inputs 402 may include one or more sets of input data to the neural network model. As shown in this example, the same model inputs 402 may provided to the first inference engine 206 executing an unconverted (or original) model 404, and to the second inference engine 208 executing a converted model 406. The unconverted model 404 and the converted model 406 may correspond to the neural network models 222 and 224 described above. In some examples, the model inputs 402 may correspond to predetermined sets of input values and/or random input values that are compatible with the input nodes of the unconverted model 404 and converted model 406.

The first inference engine 206 and the second inference engine 208 may respectively execute the unconverted model 404 and the converted model 406. As described above, the different inference engines used to execute the unconverted model 404 and the converted model 406 may use different computing architectures and may support different operations, hypermeters, and/or neural network capabilities. In the example, the first inference engine 206 may determine one or more outputs/latencies 408 of the unconverted model 404, based on the model inputs 402. Similarly, the second inference engine 208 may determine one or more outputs/latencies of the converted model 406, based on the model inputs 402.

A deviation distribution 412 may be determined by comparing the outputs/latencies 408 from the unconverted model 404 with the outputs/latencies 410 of the converted model 406. Different neural network models may produce different types of outputs, including numerical values (e.g., object positions, speeds, poses, etc.), object classifications, geometric shapes (e.g., representing image segments or bounding boxes, etc.), and the like. Accordingly, a different (or deviation) between the output of the unconverted model 404 and the converted model 406 may take the form of a numerical difference, a percentage difference, or a binary value (e.g., true/false or pass/fail), etc. The validation component(s) of the model conversion pipeline 106 may determine one or more deviation amounts/values associated with each set of model inputs 402, corresponding to the difference in the model outputs between the unconverted model 404 and the converted model 406 for the set of model inputs 402. The model conversion pipeline may determine the deviation distribution 412 using the deviation amounts/values for multiple different model inputs 402, representing the probability of model output differences for various model inputs 402.

In some examples, the deviation distribution 412 associated with a converted model 406 may represent deviations in the model outputs between the converted model 406 and the unconverted model 404. Additionally or alternatively, the deviation distribution 412 may represent deviations (or differences) in the execution time of the converted model 406 as compared to the unconverted model 404. For example, the model conversion pipeline 106 may compare latency values during execution of the unconverted model 404 and the converted model 406, using multiple different model inputs 402, to determine a deviation distribution 412 for the converted model 406 that represents model execution speed and/or latency.

Figure 5:
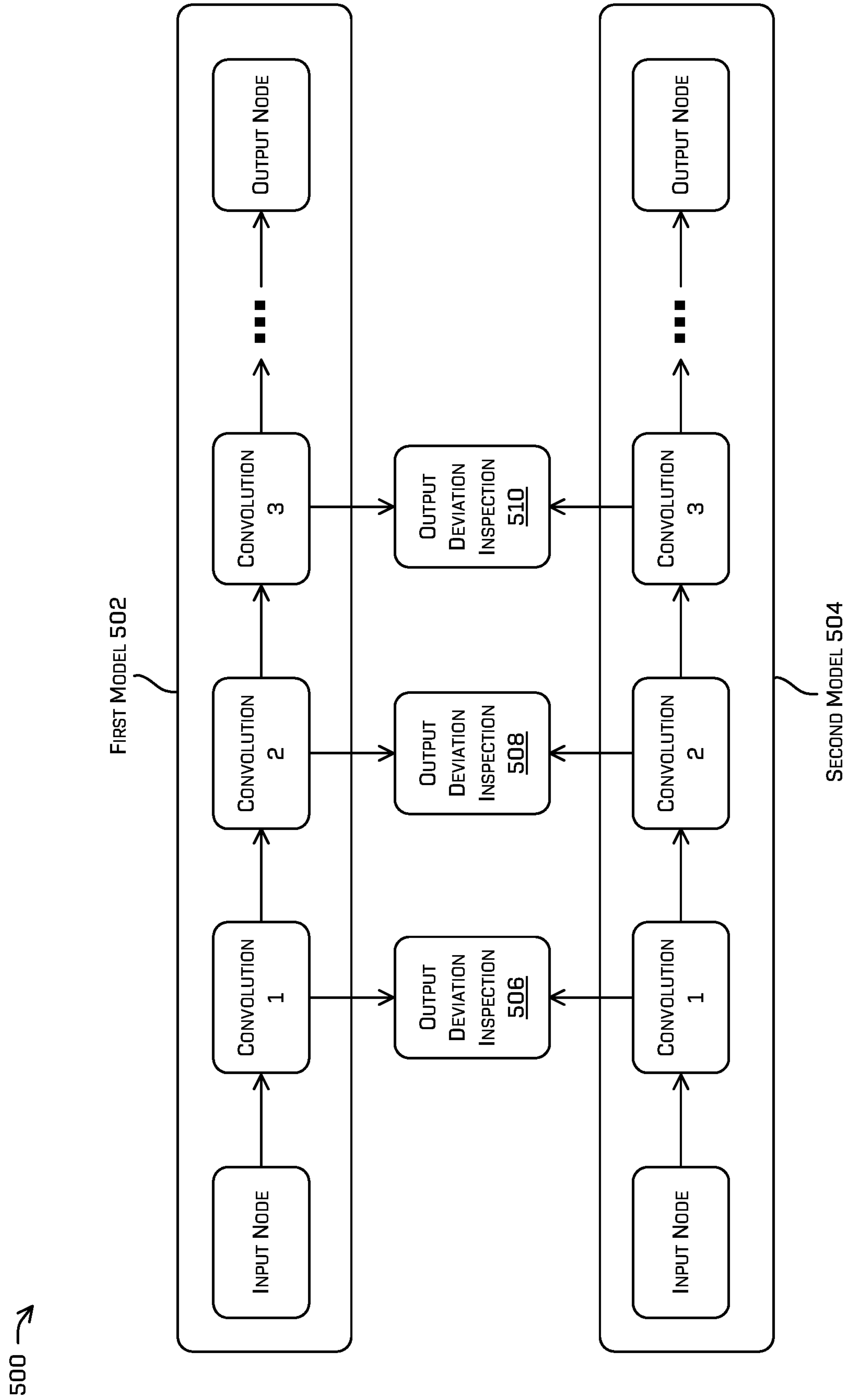
FIG. 5 illustrates components of an example system for performing an iterative output deviation inspection operation on layers of a neural network model, in accordance with one or more implementations of the disclosure.

FIG. 5 illustrates an example techniques 500 for validating a converted model by performing an iterative output deviation inspection operation on multiple layers of the model. In some examples, the techniques 500 may be used to implement the functionality of the layer-by-layer model analyzer 116 described above. As shown in this example, the converted model (e.g., first model 502) may be validated with respect to the original (or unconverted) model (e.g., second model 504), by comparing the outputs of corresponding intermediate layers within the models. As described above, by comparing the results (e.g., outputs and/or execution times/latencies) of individual layers of the converted model with the results of the corresponding layers of the unconverted model, techniques 500 may be used to determine which layer within the converted model are responsible for the which portions of the deviations between the converted and original models.

In some examples, the techniques 500 may include proceeding sequentially through the first model 502 (e.g., a converted model) layer-by-layer. At each layer, the layer-by-layer model analyzer 116 may determine a corresponding layer within the second model 504, and determine the model results (e.g., outputs and/or latencies) for execution of the corresponding layers in both models. In some examples, the layer-by-layer model analyzer 116 may compare a subset of the layers, such as the convolution layers, upsampling layers, and/or other types of layers, rather than analyzing and comparing every layer in the converted and original models. In this example, the first model 502 and the second model 504 are compared at each convolution layer, and may or may not be compared at other layers. For instance, the model conversion pipeline 106 may be configured to analyze and compare only the types of layers and/or operations that are most likely to result in deviations of the converted model. In this example, at a layer including Convolution 1, the results/output of the first model 502 and the second model 504 are compared using an output deviation inspection process 506. Similarly, at a layer including Convolution 2, the results/output of the models are compared again using a similar output deviation inspection process 508, and at a layer including Convolution 3, the results/output of the models are compared again using a similar output deviation inspection process 510. Each of the output deviation inspection processes 506-510 may use similar or identical operations to those in techniques 400, to determine deviation values and/or a deviation distribution associated with a layer in the converted model.

After determining the deviation values and/or distributions associated with multiple layers in the converted model, the layer-specific deviations for model output and/or latency may be used to validate/invalidate, or to determine a score, associated with the various layers of the converted model. For instance, the deviation values/distributions of each layer may be compared to a deviation threshold to determine if the layer is responsible for a significant amount of the overall deviations (e.g., model output and/or latency) of the converted model as a whole. In some examples, layer-specific deviation thresholds may be determined based on the overall deviation values/distributions of the converted model. Additionally or alternatively, the model conversion pipeline 106 may determine similar attributes (e.g., similar operations executed, similar hyperparameters, etc.) between different layers having significant deviations. For example, the model conversion pipeline 106 may determine individual operations or groups of operations within layers, and/or other attributes of layers within the converted model, that are associated with high deviation values/distributions. In these examples, data indicating the specific layers having relatively high deviation values/distributions, or attributes of layers having relatively high deviation values/distributions, may be provide to the model development system 102 to allow the model to be redesigned, updated, and resubmitted to the model conversion pipeline 106. Additionally or alternatively, specific layers and/or attributes of the layers also may be provided to source and/or target systems to allow them to reconfigure their applications based on the inconsistencies.

Figure 6A:
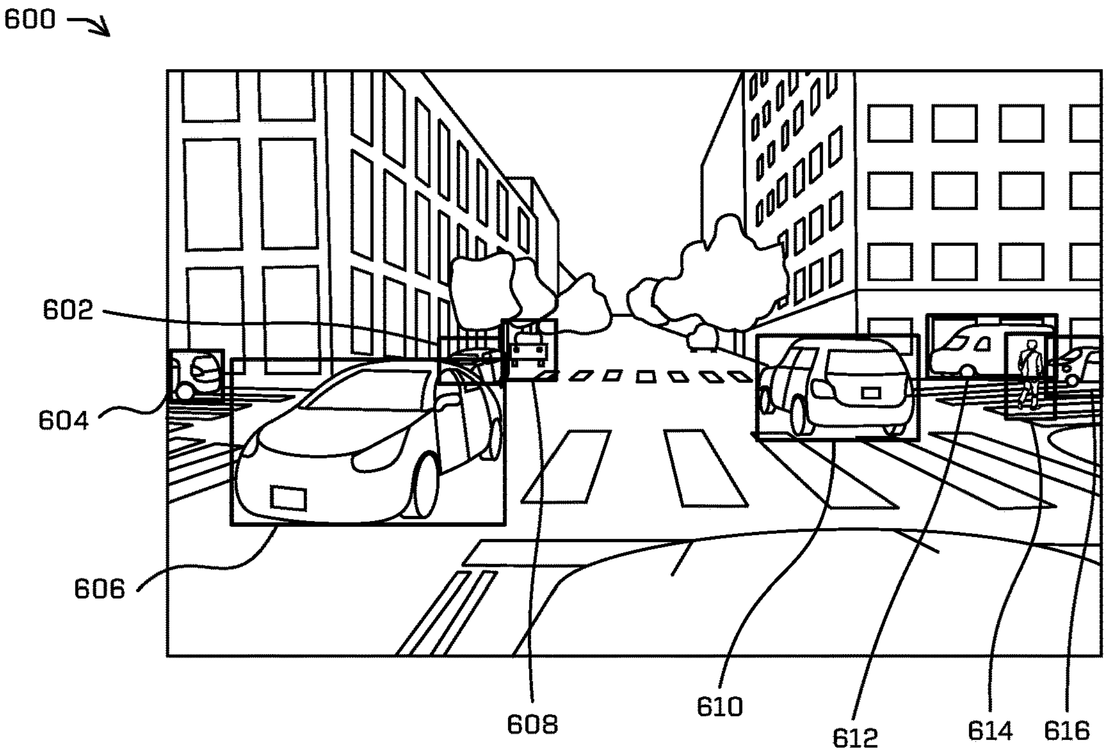
FIGS. 6A-6B are example diagrams representing the output of two neural networks configured to process images and output bounding boxes, in accordance with one or more implementations of the disclosure.
Figure 6B:
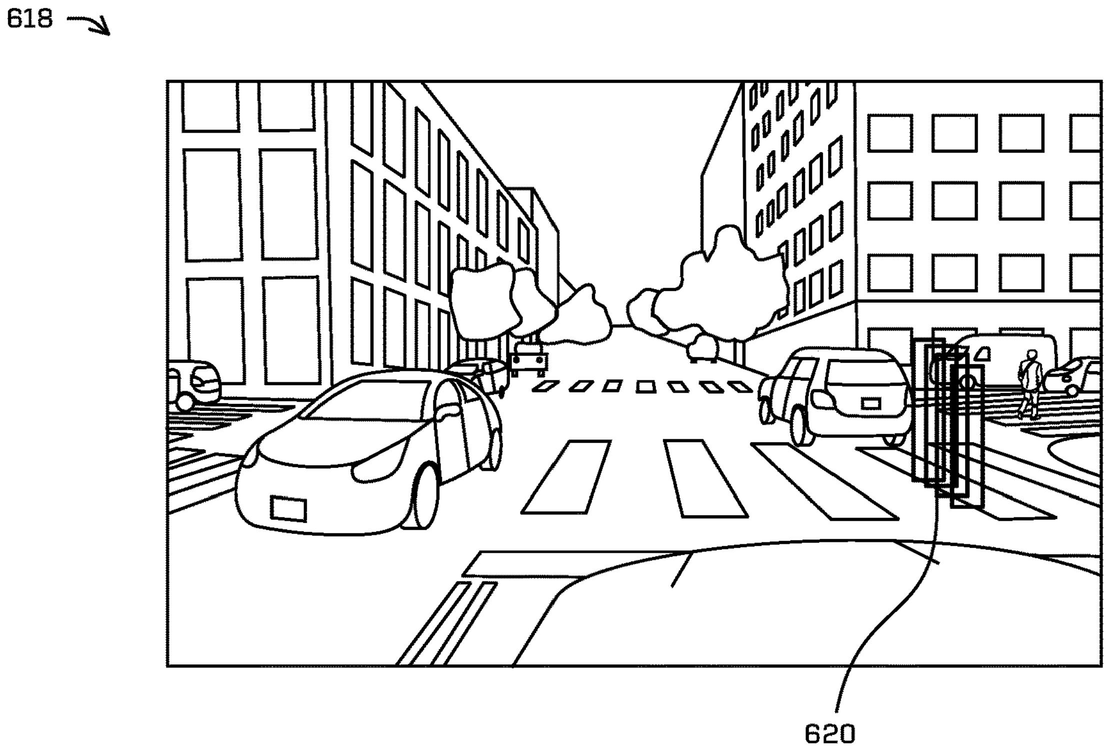

When comparing the results of the execution of converted model to the original model (or of a layer of the converted model to a corresponding layer of the original model), the results may correspond to differences in the model outputs and/or differences in model performance. For example, FIGS. 6A-6B show two example diagrams that graphically represent the difference in outputs between an original and converted neural network model configured to determine bounding boxes for objected detected within an environment. In this example, diagram 600 may correspond to the output of an original model configured to detect objects and determine bounding boxes for the objects based on sensor data provided as input to the model. As shown in this example, the original model has successfully determined several bounding boxes 602-616 associated with several different objects detected in the environment. In contrast, diagram 618 may correspond to the output of a converted model constructed based on the original model, when provided with the same sensor data as input to the converted model. In this example, the output of the converted model is significantly different from the output of the original model. Instead of the bounding boxes 602-616 associated with the objects in the environment, the converted model has output a group 620 of overlapping bounding boxes that do not accurately represent the positions of the objects in the environment.

Figure 7:
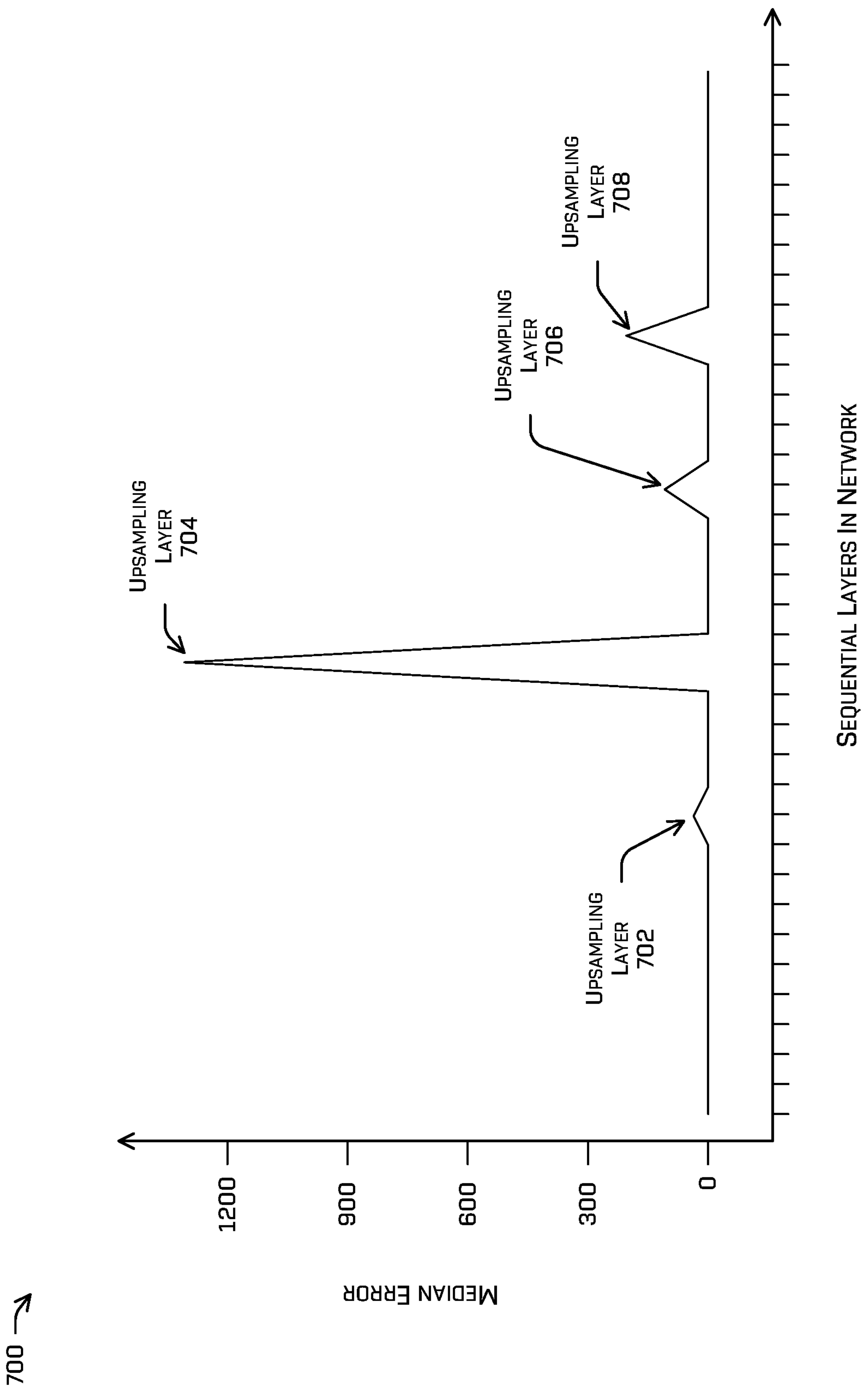
FIG. 7 is a graph representing example median error data for layers within a converted neural network model, in accordance with one or more implementations of the disclosure.

FIG. 7 shows a graph 700 representing example median error data for specific layers in a converted model, as compared to the corresponding layers within the original model. In this example, the several layers 702-708 in the converted model have significant median error values. An analyze of the layers 702-708 performed by the model conversion pipeline 106 indicates that each of the layers 702-708 corresponds to an upsampling layer. Accordingly, the model conversion pipeline 106 may determine that the conversion process used for upsampling layers and/or the execution of the upsampling operations on the inference engine of target system, may be responsible for significant errors and/or deviations from the original model. Although this example relates to error in model output, similar graphs may be generated to chart the execution time and/or latency of different layers of the converted model as compared to the corresponding layers of the original model.

In some cases, it may be tolerable or expected for a converted model to produce different outputs and/or different latencies than the original model on which it is based. For instance, the converted model may be converted for an inference engine and/or target system that supports different operations or hyperparameters than the inference engine on which the original model was executed. Additionally, the inference engine running the converted model may be operate provide output at a different speed and/or a different level of precision, or may be configured to operate on different computing architectures. Accordingly, a relatively small amount of deviation between the outputs of the converted and original models may be permissible when validating the converted model.

However, when the deviation amounts or distributions greater than the permissible level, the model conversion pipeline 106 may determine that the converted model cannot be validated and is not to be deployed to the target system(s). For instance, in FIGS. 6A and 6B the output of the converted model represented by diagram 618, deviates significantly from the output of the original model represented by diagram 600. Additionally, in FIG. 7, the model outputs produced by the upsampling layers 702-708 deviate significantly from the outputs of the corresponding layers of the original model. Accordingly, the model conversion pipeline 106 may determine in these examples that the deviation values/distributions of the converted model are greater than an acceptable deviation threshold, invalidating the converted model and causing the converted model not to be deployed on the intended target systems. Significant deviations as in these examples may be caused by, for example, software bugs within the inference engines executing the converted model, operations within the original model that are not supported by the inference engine executing the converted model, and/or errors within conversion operations used to convert the original model to the converted model.

Figure 8:
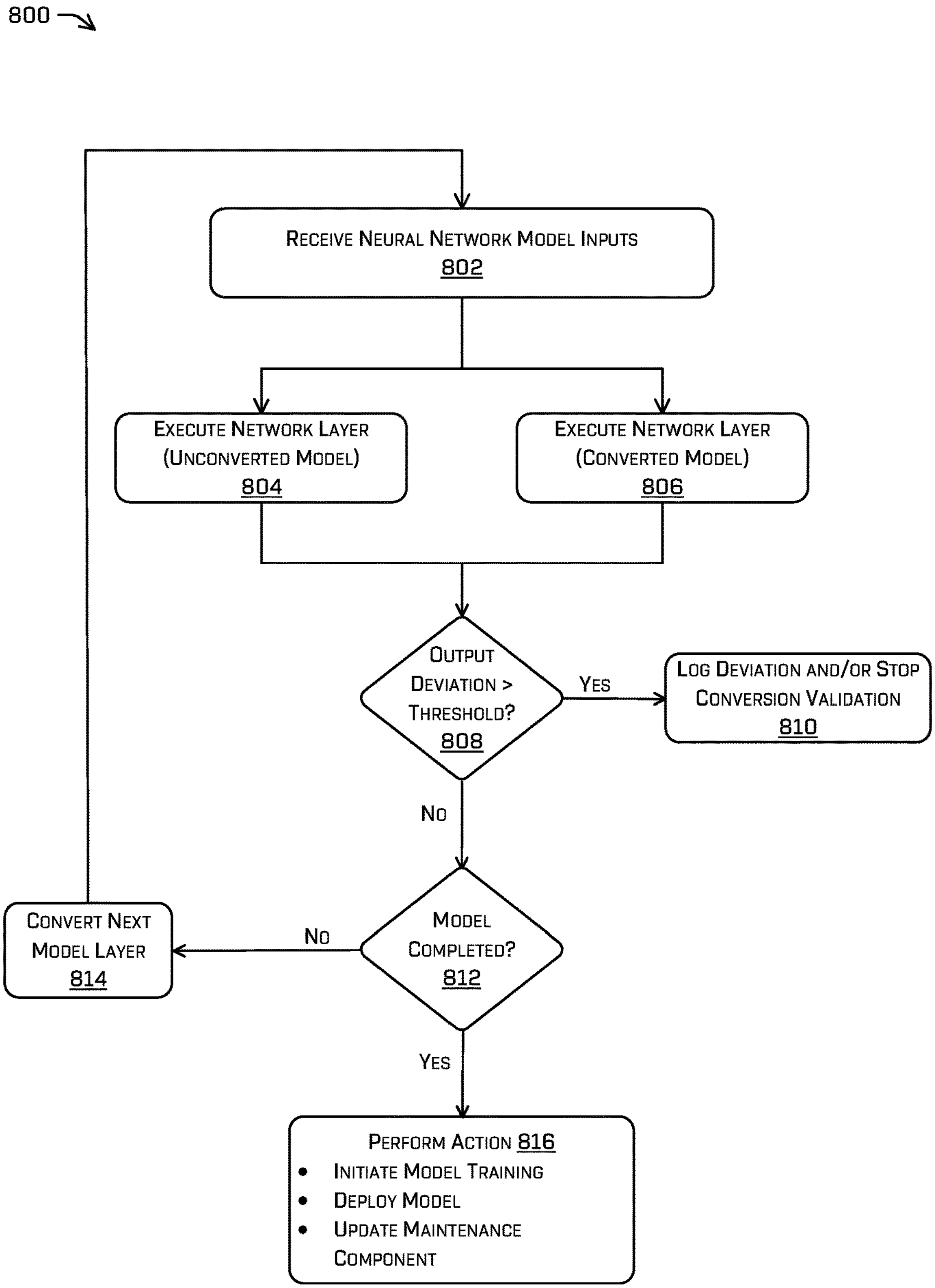
FIG. 8 is a flow diagram illustrating an example process of validating a conversion of a neural network model, in accordance with one or more implementations of the disclosure.

FIG. 8 depicts an example process 800 for validating a conversion of a neural network model, using a combination of the various techniques described herein. Some or all of the operations in process 800 can be performed by one or more components in FIGS. 1-5, as described herein. For example, some or all of the process 800 can be performed by various components within a model conversion pipeline 106 described in computing environments 100, 200, and 300.

At operation 802, computing device(s) executing the components of a model conversion pipeline 106 may receive a set of model inputs for a neural network model. The neural network model in this example may correspond to any of the types of models described herein, including but not limited to models for use on autonomous vehicles to perform computer vision tasks such as segmentation, object detection and classification, trajectory prediction, etc. A validation of the converted model may be performed using a single set of input data that can be provided to the input nodes of the model, or using multiple different input data sets. Multiple different sets of input data may provide advantages of more accurately representing the types, probabilities, and magnitudes of deviations between the results/outputs of the converted model and the original model. Accordingly, the model inputs received in operation 802 may include multiple different sets of model input data, randomly selected or predetermined, that are compatible with the neural network model.

At operations 804, the model conversion pipeline 106 may provide the input data received operation 802 to a first inference engine configured to execute one or more network layers of the original (or unconverted) model. Based on the input data, the execution of the layer(s) of the unconverted model in operation 804 may generate one or more results, which may include model outputs produced by nodes of the executed layer(s) and/or performance/latency data associated with the executed layer(s).

At operations 806, the model conversion pipeline 106 may provide the same input data received operation 802 to a second inference engine configured to execute the same or corresponding network layers of the converted model. Based on the input data, the execution of the layer(s) of the converted model in operation 806 also may generate results, including model outputs produced by nodes of the executed layer(s) and/or performance/latency data associated with the executed layer(s). As discussed above, based on differences between the original and converted models, and/or based on differences in the supported operations or and behaviors of the inference engines used to execute the corresponding network layers, the outputs generated in operations 804 and 806 may be different.

As discussed above, the network layers may include intermediate layers within the model, corresponding to a sequence layers and/or certain types of layers/operations to be evaluated in a layer-by-layer analysis. In some examples, the first iteration of operations 804 and 806 may execute the first layer of the model, the second iteration of operations 804 and 806 may execute the second layer of the model, and so on. Additionally or alternatively, in successive iterations of operations 804 and 806, successive layer/operations of certain types (e.g., convolution layers, upsampling layers, etc.) may be executed. In still other examples, the layers executed in operations 804 and 806 may be particular layers determined as upstream or downstream layers from previously analyzed layers, based on the output deviations of the previous layers. For instance, if an intermediate layer of a converted model does not have a significant deviation, the model conversion pipeline 106 may select a downstream layer for a subsequent iteration of operations 804 and 806. In contrast, if the intermediate layer of the converted model has a significant deviation, the model conversion pipeline 106 may select an upstream layer for a subsequent iteration of operations 804 and 806, in order to more efficiently identify the layer(s) responsible for the significant output deviations.

At operation 808, the model conversion pipeline 106 may compare the outputs received from the execution of the layers of the unconverted model in operation 804 and the outputs received from the execution of the corresponding layers of the converted model in operation 806. The differences (or deviations) in the outputs may correspond to differences in individual model outputs, deviation distributions based on multiple different sets of input data, and/or deviations in execution time, latency, or other performance metrics. In this example, when the deviation in outputs between the unconverted model and the converted model is greater than a deviation threshold, then at operation 810 the model conversion pipeline 106 may log data indicating the deviation and/or may stop the conversion validation process 800.

In this example, when the deviation in outputs between the unconverted model and the converted model is less than a deviation threshold, then at operation 812 the model conversion pipeline 106 may determine whether or not there are additional layers in the model to be inspected. For example, when process 800 is iterating sequentially (or otherwise moving from upstream layers to downstream layers in the model), then the model is determined to be completed in operation 812 when the output nodes are reached. In other examples, process 800 may be configured to iterate non-sequentially, and may move upstream or downstream in successive iterations in order to identify with more granularity the layers responsible for the output deviations. In such examples, the model may be completed when one or more specific intermediate layers or operations are identified that are responsible for the output deviations, and/or when a lowest of level of granularity within the model has been reached.

When the model conversion pipeline 106 determines that the validation of the model is not completed and that there are additional layers to be inspected (812: No), then at operation 814 the model conversion pipeline 106 may determine and convert the next layer of the original model into converted layer, and may return to operation 802 to validate the next converted layer. As noted above, the next layer determined in operation 814 may be a next layer sequentially within the model (e.g., downstream), or may be a different layer that can be upstream or downstream of the previous layer, based on the deviation values/distributions of the previously inspected layers.

In contrast, when the model conversion pipeline 106 determines that the validation of the model is completed and that there are no additional layers to be inspected (812: Yes), then at operation 816 the model conversion pipeline 106 may initiate one or more actions based on a successful validation of the converted model. For example, if process 800 is performed on a pretrained model by an untrained model validation component 110, then at operation 816 the untrained model validation component 110 may be configured to initiate training of the neural network model. In other examples, when process 800 is performed on a fully-trained model, then at operation 816 in response to the successful validation of the converted model the model conversion pipeline 106 may initiate a model deployment component 118 to deploy the converted model to one or more target systems. Additionally or alternatively, the model conversion pipeline 106 may update the conversion maintenance component 120 based on the successful validation of the converted model, including updating listings of operations supported by the inference engine of the target systems, and/or updating the hyperparameters and other conversion options used in the successful conversion.

EXAMPLE CLAUSES

A. A system comprising: one or more processors; and one or more non-transitory computer-readable media storing computer-executable instructions that, when executed, cause the system to perform operations comprising: executing a first neural network model; determining a first output of a first intermediate layer of the first neural network model; executing a second neural network model, wherein the second neural network model is a converted neural network model based on the first neural network model; determining a second output of a second intermediate layer of the second neural network model, wherein the second intermediate layer corresponds to the first intermediate layer of the first neural network model; determining a third intermediate layer of the first neural network model, based at least in part on the first output and the second output; determining a third output of the third intermediate layer of the first neural network model; determining a fourth output of a fourth intermediate layer of the second neural network model, wherein the fourth intermediate layer corresponds to the third intermediate layer of the first neural network model; and performing an action based at least in part on the third output and the fourth output.

B. The system as recited in paragraph A, wherein determining the third intermediate layer of the first neural network model comprises: determining a difference between the first output and the second output; and determining a layer downstream of the first intermediate layer as the third intermediate layer, based at least in part on determining that the difference is less than a difference threshold associated with the first intermediate layer.

C. The system as recited in paragraph A, the operations further comprising: converting a first portion of the first neural network model into a first converted portion of the second neural network model, based at least in part on a first difference between the first output and the second output, wherein the converting comprises replacing at least one operation in the third intermediate layer of the first neural network model with at least one replacement operation in the second intermediate layer of the second neural network model, and wherein the performing the action comprises converting a second portion of the first neural network model into a second converted portion of the second neural network model, based at least in part on a second difference between the third output and the fourth output.

D. The system as recited in paragraph A, wherein the first neural network model and the second neural network model are untrained models that include a set of weights determined at least in part by a random selection, and wherein performing the action comprises: determining a difference between the third output and the fourth output; and initiating a training process for the first neural network model, based at least in part on determining that the difference is less than a difference threshold associated with the third intermediate layer.

E. The system as recited in paragraph A, wherein: executing the first neural network model comprises using a first inference engine supporting a first set of operations to execute the first neural network model; executing the second neural network model comprises using a second inference engine to execute the second neural network model; and performing the action comprises determining an operation within the first set of operations that is unsupported by the second inference engine, based at least in part on the third output and the fourth output.

F. A method comprising: determining a first intermediate layer of a first neural network, wherein the first intermediate layer includes one or more nodes within the first neural network between a first set of input nodes and a first set of output nodes; determining a first output of the first intermediate layer of the first neural network, wherein determining the first output comprises providing input data to the first set of input nodes; determining a second intermediate layer of a second neural network, wherein the second intermediate layer is associated with the first intermediate layer of the first neural network; determining a second output of the second intermediate layer of the second neural network, wherein determining the second output comprises providing the input data to a second set of input nodes of the second neural network; and comparing the first output of the first intermediate layer to the second output of the second intermediate layer.

G. The method of paragraph F, further comprising: converting a portion of the first neural network into a converted portion of the second neural network, based at least in part on comparing the first output of the first intermediate layer to the second output of the second intermediate layer.

H. The method of paragraph F, further comprising: determining a third intermediate layer of the first neural network, based at least in part on comparing the first output of the first intermediate layer to the second output of the second intermediate layer; determining a third output of the third intermediate layer of the first neural network; determining a fourth intermediate layer of the second neural network, wherein the fourth intermediate layer is associated with the third intermediate layer of the first neural network; and determining a fourth output of the fourth intermediate layer of the second neural network.

I. The method of paragraph F, wherein the first neural network and the second neural network are untrained, and wherein the method further comprises: determining a set of weights based at least in part on random selection, wherein determining the first output of the first intermediate layer comprises executing the first neural network with the set of weights, and wherein determining the second output of the second intermediate layer comprises executing the second neural network with the set of weights.

J. The method of paragraph I, further comprising: initiating a training process for the first neural network, based at least in part on comparing the first output of the first intermediate layer to the second output of the second intermediate layer.

K. The method of paragraph F, wherein: determining the first output of the first intermediate layer comprises executing the first neural network using a first inference engine supporting a first set of operations; determining the second output of the second intermediate layer comprises executing the second neural network using a second inference engine supporting a second set of operations; and the method further comprises determining an operation within the first set of operations that is unsupported by the second inference engine, based at least in part on comparing the first output of the first intermediate layer to the second output of the second intermediate layer.

L. The method of paragraph F, further comprising: executing the first neural network using a first inference engine; executing the second neural network using a second inference engine; determining a first operation within the first neural network, wherein the first operation is supported by the first inference engine; determining a second operation associated with the first operation, wherein the second operation is supported by the second inference engine; and converting the first neural network into the second neural network, wherein the second neural network includes the second operation.

M. The method of paragraph F, wherein comparing the first output of the first intermediate layer to the second output of the second intermediate layer comprises: determining a first latency associated with the first output; determining a second latency associated with the second output; determining a difference between the first output and the second output; and determining a latency difference between the first latency and the second latency.

N. One or more non-transitory computer-readable media storing processor-executable instructions that, when executed by one or more processors, cause the one or more processors to perform operations comprising: determining a first intermediate layer of a first neural network, wherein the first intermediate layer includes one or more nodes within the first neural network between a first set of input nodes and a first set of output nodes; determining a first output of the first intermediate layer of the first neural network, wherein determining the first output comprises providing input data to the first set of input nodes; determining a second intermediate layer of a second neural network, wherein the second intermediate layer is associated with the first intermediate layer of the first neural network; determining a second output of the second intermediate layer of the second neural network, wherein determining the second output comprises providing the input data to a second set of input nodes of the second neural network; and comparing the first output of the first intermediate layer to the second output of the second intermediate layer.

O. The one or more non-transitory computer-readable media of paragraph N, the operations further comprising: converting a portion of the first neural network into a converted portion of the second neural network, based at least in part on comparing the first output of the first intermediate layer to the second output of the second intermediate layer.

P. The one or more non-transitory computer-readable media of paragraph N, the operations further comprising: determining a third intermediate layer of the first neural network, based at least in part on comparing the first output of the first intermediate layer to the second output of the second intermediate layer; determining a third output of the third intermediate layer of the first neural network; determining a fourth intermediate layer of the second neural network, wherein the fourth intermediate layer is associated with the third intermediate layer of the first neural network; and determining a fourth output of the fourth intermediate layer of the second neural network.

Q. The one or more non-transitory computer-readable media of paragraph N, wherein the first neural network and the second neural network are untrained, and wherein the operations further comprise: determining a set of weights based at least in part on random selection, wherein determining the first output of the first intermediate layer comprises executing the first neural network with the set of weights, and wherein determining the second output of the second intermediate layer comprises executing the second neural network with the set of weights.

R. The one or more non-transitory computer-readable media of paragraph Q, the operations further comprising: initiating a training process for the first neural network, based at least in part on comparing the first output of the first intermediate layer to the second output of the second intermediate layer.

S. The one or more non-transitory computer-readable media of paragraph N, wherein: determining the first output of the first intermediate layer comprises executing the first neural network using a first inference engine supporting a first set of operations; determining the second output of the second intermediate layer comprises executing the second neural network using a second inference engine supporting a second set of operations; and the operations further comprise determining an operation within the first set of operations that is unsupported by the second inference engine, based at least in part on comparing the first output of the first intermediate layer to the second output of the second intermediate layer.

T. The one or more non-transitory computer-readable media of paragraph N, the operations further comprising: executing the first neural network using a first inference engine; executing the second neural network using a second inference engine; determining a first operation within the first neural network, wherein the first operation is supported by the first inference engine; determining a second operation associated with the first operation, wherein the second operation is supported by the second inference engine; and converting the first neural network into the second neural network, wherein the second neural network includes the second operation.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

converting a first neural network model into a second neural network model by replacing at least one original neural network operation with at least one replacement neural network operation, wherein:

the first neural network model is untrained and associated with first hardware, the second neural network model is untrained and associated with second hardware having distinct computing performance from the first hardware, the second hardware does not support the at least one original neural network operation, the second hardware supports the at least one replacement neural network operation, and the second neural network model is configured to run on an autonomous vehicle;

receiving the first neural network model and receiving the second neural network model;

executing the first neural network model using a set of weights associated with the first neural network model;

determining a first output of a first intermediate layer of the first neural network model, wherein the first intermediate layer of the first neural network model performs the at least one original neural network operation;

executing the second neural network model;

determining a second output of a second intermediate layer of the second neural network model, wherein the second intermediate layer corresponds to the first intermediate layer of the first neural network model and performs the at least one replacement neural network operation;

replacing the at least one replacement neural network operation of the second intermediate layer with a second replacement operation supported by the second hardware, wherein:

replacing the at least one replacement neural network operation is based at least in part on determining that a first deviation between the first output and the second output exceeds a first threshold value, and replacing the at least one replacement neural network operation reduces the first deviation below the first threshold value;

determining a third intermediate layer of the first neural network model, based at least in part on the first deviation being below the first threshold value, and further based at least in part on the third intermediate layer being associated with a second layer type, the second layer type indicating a second operation type performed by the third intermediate layer;

converting a first portion of the first neural network model into a first updated portion of the second neural network model, based at least in part on the first deviation being below the first threshold value, wherein:

the first portion comprises the third intermediate layer, and converting the first portion comprises replacing at least one operation in the third intermediate layer of the first neural network model with the second replacement operation from the second intermediate layer of the second neural network model;

determining a third output of the third intermediate layer of the first neural network model;

determining a fourth output of a fourth intermediate layer of the second neural network model, wherein the fourth intermediate layer corresponds to the third intermediate layer of the first neural network model and performs a third replacement operation;

replacing the third replacement operation of the fourth intermediate layer with a fourth replacement operation supported by the second hardware, wherein:

replacing the third replacement operation is based at least in part on determining that a second deviation between the third output and the fourth output exceeds a second threshold value, and replacing the third replacement operation reduces the second deviation below the second threshold value; and performing an action based at least in part on the second deviation being below the second threshold value, wherein the action comprises training the second neural network model.

2. The system as recited in claim 1, wherein determining the third intermediate layer of the first neural network model comprises:

determining a layer downstream of the first intermediate layer as the third intermediate layer, based at least in part on determining that the first deviation is less than a difference threshold associated with the first intermediate layer.

3. The system as recited in claim 1, wherein:

performing the action further comprises converting a second portion of the first neural network model into a second updated portion of the second neural network model, based at least in part on a second difference between the third output and the fourth output.

4. The system as recited in claim 1, wherein:

executing the first neural network model comprises using a first inference engine supporting a first set of operations to execute the first neural network model;

executing the second neural network model comprises using a second inference engine to execute the second neural network model;

the first inference engine is associated with the first hardware and the second inference engine is associated with the second hardware; and performing the action comprises determining an operation within the first set of operations that is unsupported by the second inference engine, based at least in part on the third output and the fourth output indicating a conversion failure.

5. The system as recited in claim 1, wherein the action comprises a validation operation, a model update operation, and a resubmission operation, the model update operation and the resubmission operation being based at least in part on the validation operation indicating that the third output and the fourth output differ by more than a deviation threshold associated with a conversion failure.

6. The system as recited in claim 5, wherein the validation operation comprises determining that the second neural network model comprises at least one operation in a listing of unsupported operations, the listing of unsupported operations comprising one or more operations unsupported by the second hardware and supported by the first hardware.

7. The system as recited in claim 5, wherein the model update operation comprises updating the first neural network model.

8. The system as recited in claim 1, wherein the second neural network model comprises a subset of layers, each layer of the subset of layers corresponding to a layer of the first neural network model based at least in part on a first layer type of the first intermediate layer and the second layer type.

9. The system as recited in claim 1, wherein a first layer type of the first intermediate layer and the second layer type comprise at least one of a convolution type, an upsampling type, or a type associated with a likelihood of deviation, wherein the likelihood of deviation is based at least in part on the type.

10. The system as recited in claim 1, wherein the action comprises updating a listing of unsupported operations, the listing of unsupported operations comprising one or more operations unsupported by the second hardware and supported by the first hardware.

11. The system as recited in claim 1, wherein the first neural network model and the second neural network model are executed using at least one of a set of predetermined inputs or a set of randomized inputs.

12. The system as recited in claim 1, wherein the first neural network model is a frozen model and the set of weights is at least one of a set of predetermined weights or a set of randomized weights.

13. A method comprising:

converting a first neural network into a second neural network by replacing at least one original neural network operation with at least one replacement neural network operation, wherein:

the first neural network is untrained and associated with first hardware,
the second neural network is untrained and associated with second hardware having distinct computing performance from the first hardware,
the second hardware does not support the at least one original neural network operation,
the second hardware supports the at least one replacement neural network operation, and
the second neural network is configured to run on an autonomous vehicle;
executing the first neural network using a set of weights associated with the first neural network, wherein executing the first neural network comprises executing a first intermediate layer of the first neural network, wherein:
the first layer type indicates an operation type of the first intermediate layer, and the first intermediate layer of the first neural network outputs a first output, wherein the first output is based at least in part on the first intermediate layer performing the at least one original neural network operation;
executing the second neural network using the set of weights, wherein executing the second neural network comprises executing a second intermediate layer of the second neural network, wherein:
the second intermediate layer is associated with the first intermediate layer of the first neural network, and
the second intermediate layer of the second neural network outputs a second output, wherein the second output is based at least in part on the second intermediate layer performing the at least one replacement neural network operation;
replacing the at least one replacement neural network operation of the second intermediate layer with a second replacement operation supported by the second hardware, wherein:
replacing the at least one replacement neural network operation is based at least in part on determining that a first deviation between the first output and the second output exceeds a first threshold value, and
replacing the at least one replacement neural network operation reduces the first deviation below the first threshold value;
converting a first portion of the first neural network into a first updated portion of the second neural network, based at least in part on the first deviation being below the first threshold value, wherein:
the first portion comprises a third intermediate layer of the first neural network, and
converting the first portion comprises replacing at least one operation in the third intermediate layer of the first neural network with the second replacement operation from the second intermediate layer of the second neural network;
determining the third intermediate layer of the first neural network, based at least in part on the first deviation being below the first threshold value;
determining a third output of the third intermediate layer of the first neural network;
determining a fourth output of a fourth intermediate layer of the second neural network, wherein the fourth intermediate layer is associated with the third intermediate layer of the first neural network and performs a third replacement operation;
replacing the third replacement operation of the fourth intermediate layer with a fourth replacement operation supported by the second hardware, wherein:
replacing the third replacement operation is based at least in part on determining that a second deviation between the third output and the fourth output exceeds a second threshold value, and
replacing the third replacement operation reduces the second deviation below the second threshold value; and
performing an action based at least in part on the second deviation being below the second threshold value, wherein the action comprises training the second neural network.

14. The method of claim 13, further comprising:
initiating a training process for the first neural network, based at least in part on comparing the first output of the first intermediate layer to the second output of the second intermediate layer.

15. The method of claim 13, wherein:
determining the first output of the first intermediate layer comprises executing the first neural network using a first inference engine supporting a first set of operations;
determining the second output of the second intermediate layer comprises executing the second neural network using a second inference engine supporting a second set of operations; and
the method further comprises determining an operation within the first set of operations that is unsupported by the second inference engine, based at least in part on comparing the first output of the first intermediate layer to the second output of the second intermediate layer.

16. The method of claim 13, further comprising:
determining a first operation within the first neural network, wherein the first operation is supported by a first inference engine;
determining a second operation associated with the first operation, wherein:
the second operation is supported by a second inference engine, and
the second neural network includes the second operation, based at least in part on the converting the first neural network into the second neural network;
executing the first neural network using the first inference engine; and
executing the second neural network using the second inference engine.

17. The method of claim 13, wherein comparing the first output of the first intermediate layer to the second output of the second intermediate layer comprises:
determining a first latency associated with the first output;
determining a second latency associated with the second output;
determining a difference between the first output and the second output; and
determining a latency difference between the first latency and the second latency.

18. The method as recited in claim 13, wherein:
the first intermediate layer is associated with a first layer type,
the first layer type indicates an operation type of the first intermediate layer, and
the second intermediate layer is associated with the first intermediate layer of the first neural network based at least in part on the second intermediate layer having the first layer type.

19. The method as recited in claim 13, wherein the at least one original neural network operation is associated with a previously determined listing of unsupported operations, the previously determined listing of unsupported operations comprising one or more operations unsupported by the second hardware and supported by the first hardware.

20. The method as recited in claim 13, wherein the third intermediate layer is subsequent to the first intermediate layer in the first neural network and the fourth intermediate layer is subsequent to the second intermediate layer in the second neural network.

21. One or more non-transitory computer-readable media storing processor-executable instructions that, when executed by one or more processors, cause the one or more processors to perform operations comprising:

converting a first neural network into a second neural network by replacing at least one original neural network operation with at least one replacement neural network operation, wherein:

the first neural network is untrained and associated with first hardware, the second neural network is untrained and associated with second hardware having distinct computing performance from the first hardware, the second hardware does not support the at least one original neural network operation, the second hardware supports the at least one replacement neural network operation, and the second neural network is configured to run on an autonomous vehicle;

executing the first neural network using a set of weights associated with the first neural network, wherein executing the first neural network comprises executing a first intermediate layer of the first neural network, wherein:

the first intermediate layer of the first neural network outputs a first output, wherein the first output is based at least in part on the first intermediate layer performing the at least one original neural network operation;

executing the second neural network using the set of weights, wherein executing the second neural network comprises executing a second intermediate layer of the second neural network, wherein:

the second intermediate layer is associated with the first intermediate layer of the first neural network, and the second intermediate layer of the second neural network outputs a second output, wherein the second output is based at least in part on the second intermediate layer performing the at least one replacement neural network operation;

replacing the at least one replacement neural network operation of the second intermediate layer with a second replacement operation supported by the second hardware, wherein:

replacing the at least one replacement neural network operation is based at least in part on determining that a first deviation between the first output and the second output exceeds a first threshold value, and replacing the at least one replacement neural network operation reduces the first deviation below the first threshold value;

converting a first portion of the first neural network into a first updated portion of the second neural network, based at least in part on the first deviation being below the first threshold value, wherein:

the first portion comprises a third intermediate layer of the first neural network, and converting the first portion comprises replacing at least one operation in the third intermediate layer of the first neural network with the second replacement operation from the second intermediate layer of the second neural network;

determining the third intermediate layer of the first neural network, based at least in part on the first deviation being below the first threshold value;

determining a third output of the third intermediate layer of the first neural network;

determining a fourth output of a fourth intermediate layer of the second neural network, wherein the fourth intermediate layer is associated with the third intermediate layer of the first neural network and performs a third replacement operation;

replacing the third replacement operation of the fourth intermediate layer with a fourth replacement operation supported by the second hardware, wherein:

replacing the third replacement operation is based at least in part on determining that a second deviation between the third output and the fourth output exceeds a second threshold value, and replacing the third replacement operation reduces the second deviation below the second threshold value; and performing an action based at least in part on the second deviation being below the second threshold value, wherein the action comprises training the second neural network.

22. The one or more non-transitory computer-readable media of claim 21, wherein:

determining the first output of the first intermediate layer comprises executing the first neural network using a first inference engine supporting a first set of operations;

determining the second output of the second intermediate layer comprises executing the second neural network using a second inference engine supporting a second set of operations; and the operations further comprise determining an operation within the first set of operations that is unsupported by the second inference engine, based at least in part on comparing the first output of the first intermediate layer to the second output of the second intermediate layer.

* * * * *